J. GAVURA.

COMBINED FLYING MACHINE AND AUTOMOBILE.

APPLICATION FILED JUNE 25, 1912.

1,069,688. Patented Aug. 12, 1913.

3 SHEETS—SHEET 1.

Inventor

J. Gavura.

Witnesses

By Attorneys

COLUMBIA PLANOGRAPH CO., WASHINGTON, D. C.

244 AERONAUTICS
49

J. GAVURA.

COMBINED FLYING MACHINE AND AUTOMOBILE.

APPLICATION FILED JUNE 25, 1912.

1,069,688. Patented Aug. 12, 1913.

3 SHEETS—SHEET 2.

Witnesses

Ferdinand Esper

R. W. Bishop

Inventor

J. Gavura.

By [signature] Attorneys.

COLUMBIA PLANOGRAPH CO., WASHINGTON, D. C.

49
J. GAVURA.
COMBINED FLYING MACHINE AND AUTOMOBILE.
APPLICATION FILED JUNE 25, 1912.
1,069,688.
Patented Aug. 12, 1913.
3 SHEETS—SHEET 3.
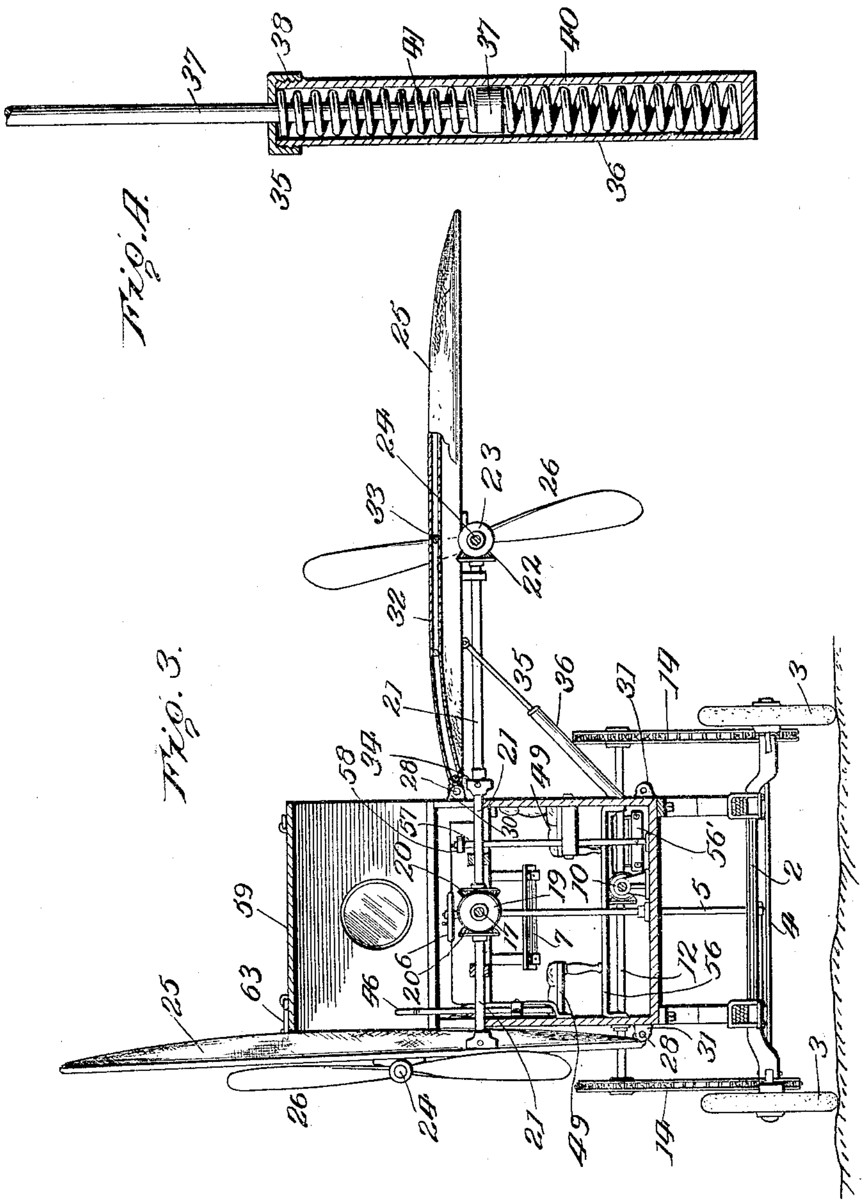
Inventor
J. Gavura.
Witnesses
By Attorneys
COLUMBIA PLANOGRAPH CO., WASHINGTON, D. C.

49

UNITED STATES PATENT OFFICE.

JOSEPH GAVURA, OF JOHNSTOWN, PENNSYLVANIA.

COMBINED FLYING-MACHINE AND AUTOMOBILE.

1,069,688. Specification of Letters Patent. Patented Aug. 12, 1913.

Application filed June 25, 1912. Serial No. 705,831.

*To all whom it may concern:*

Be it known that I, JOSEPH GAVURA, citizen of the United States, residing at Johnstown, in the county of Cambria and State of Pennsylvania, have invented certain new and useful Improvements in Combined Flying-Machines and Automobiles, of which the following is a specification.

This invention relates to self-propelled vehicles, and has for its object the provision of a vehicle which may be navigated in the air or upon the surface of the earth, so that, should an aviator be compelled to alight through stress of circumstances, such as the development of a severe storm, he may continue his travel upon the ground.

The invention also has for its object the provision of a simple, efficient, and durable apparatus which may be used for the transportation of passengers and in which the operating parts will be so disposed as to be entirely under the control of the aviator.

The several objects of the invention are attained in such a device as is illustrated in the accompaning drawings, and the invention consists in certain novel features which will be hereinafter first fully described and then more particularly claimed.

Figure 1:
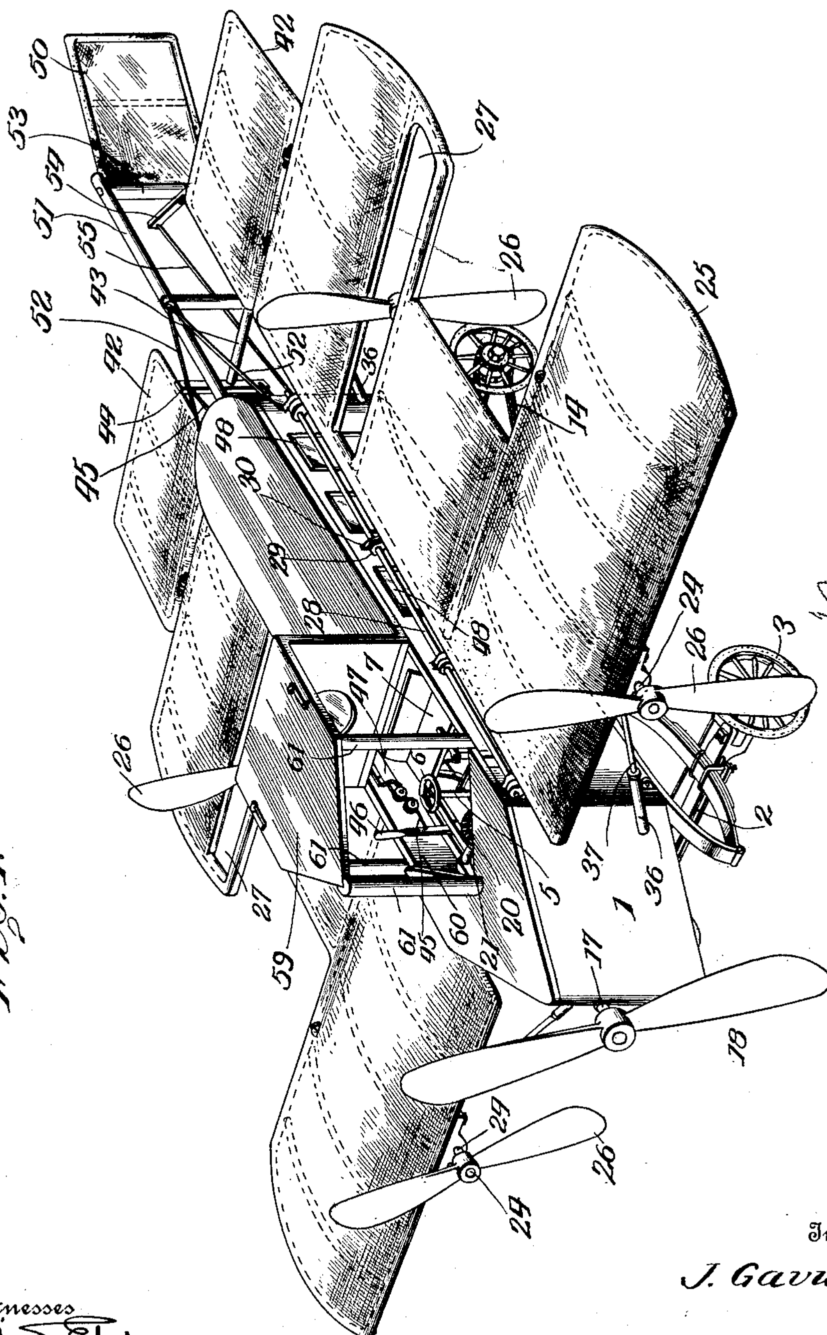
Figure 2:
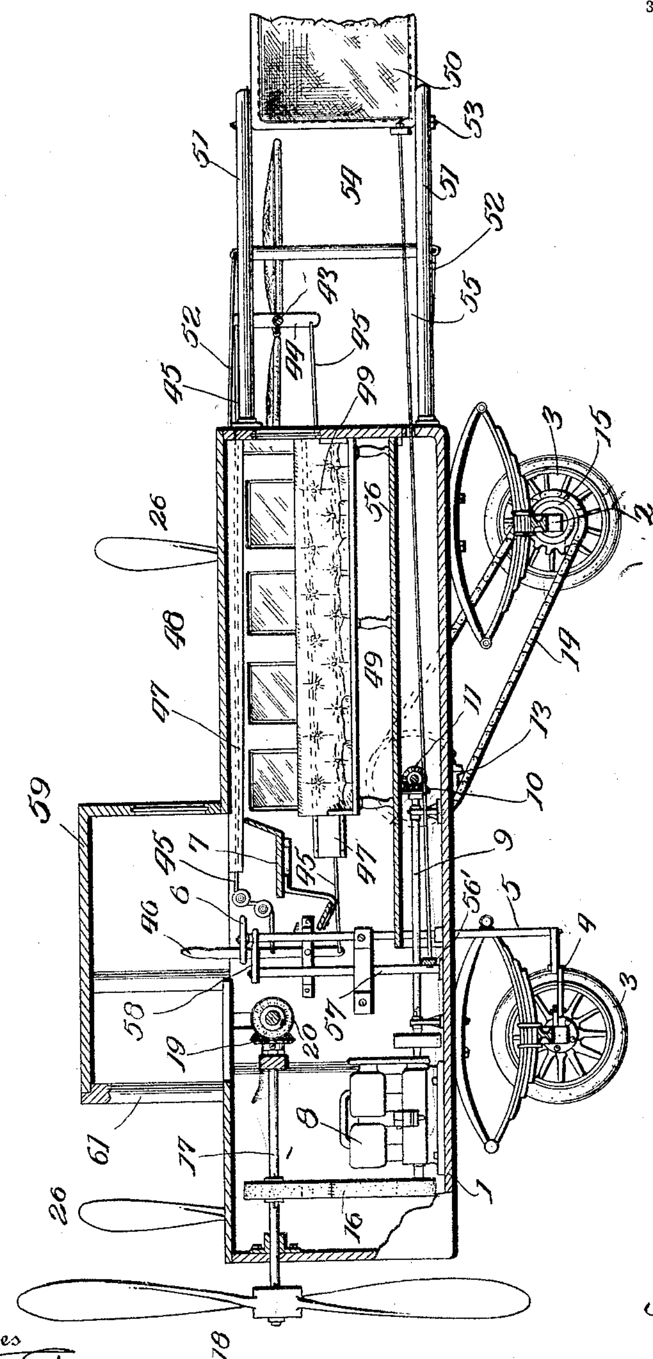

In the drawings:—Figure 1 is a perspective view of an apparatus embodying my present invention; Fig. 2 is a longitudinal vertical section of the same; Fig. 3 is a view partly in end elevation and partly in transverse vertical section showing one of the wings or supporting planes disposed as it appears when navigating the air and the other wing folded to the side of the vehicle body to show the disposition of the same when traveling over the ground; Fig. 4 is a detail sectional view of a brace or yieldable support for the side wings or planes.

In carrying out my invention, I employ a body 1 which has its forward end tapered, as shown clearly in Fig. 1, whereby it will offer the least possible resistance to the air, and the said body is mounted upon axles 2 having wheels 3 upon their ends whereby it may travel over the surface of the ground, as will be readily understood. The forward axle is equipped with a steering mechanism 4 controlled by a steering post 5 rising therefrom through the bottom of the body 1 and having a hand wheel 6 on its upper end immediately in front of the aviator's seat 7, which will be supported in any convenient manner within the body of the vehicle.

An engine 8 is mounted within the front end of the body, and a driving shaft 9 extends rearwardly from the said engine longitudinally of the body, the rear end of the said shaft being equipped with a bevel pinion 10 meshing with a similar pinion 11 on a transverse shaft 12 which extends through the sides of the body and has sprocket wheels 13 on its outer ends. Chains 14 pass around the said sprocket wheels and around sprocket pinions 15 on the rear axle, so that motion may be transmitted from the motor to the said rear axle to impart rotation to the rear carrying wheels 3 and thereby propel the vehicle over the ground. The motor will be provided with suitable clutch mechanism, so that it may be adjusted to drive the said shaft 9 or permit said shaft to remain at rest and then transmit power through a belt or other connection 16 to a propeller shaft 17 disposed longitudinally within the upper portion of the body and projecting from the front end thereof, as clearly shown.

The main propeller 18 is secured rigidly upon the forward extremity of the shaft 17, and the inner rear extremity of said shaft is equipped with a bevel pinion 19 meshing with similar pinions 20 on the inner ends of transverse shafts 21 which extend through the side walls of the body and are equipped with pinions 22 at their outer ends. These pinions 22 mesh with similar pinions 23 on the front ends of supplemental propeller shafts 24 which are disposed parallel with the sides of the body and are supported in suitable bearings secured on the undersides of the wings or supporting planes 25. Propellers 26 are secured upon the front and rear ends of the said shafts 24, the forward propellers 26 being disposed in advance of the wings or planes 25, while the rear propellers play in transverse slots 27 formed in the said wings to accommodate the said propellers, as shown in Fig. 1.

The supporting planes or wings 25 are secured to the sides of the body by hinge rods 28 inserted through eyes 29 at the inner edges of the wings and similar eyes 30 on the sides of the body, as will be readily understood, and similar eyes 31 are provided on the sides of the body near the lower edge thereof so that the wings or planes may be attached to the body at the top or bottom of the same accordingly as it is intended to navigate the air or travel upon the ground. The wings are constructed of any suitable fabric, such as canvas, possessing the necessary durability without weight, the said material forming a cover 32 for a frame consisting of light rods 33 disposed transversely and longitudinally of the wings, as will be readily understood. The transverse shafts 21 are provided with universal joints 34 which are disposed in the same vertical plane as the hinge connections between the planes and the body, so that the said shafts may have their outer portions folded against the wings, if the wings be turned upwardly, while connected with the body at the top of the same. This arrangement will be found desirable if it should be necessary to propel the machine through streets or through narrow places preparatory to making a flight, under which circumstances, shifting of the planes to the lower portion of the body would involve unnecessary labor and loss of time. Should an accident, or other circumstances beyond the control of the operator, force the machine to alight before a flight is finished, the wings may be disconnected from the top of the body and attached to the bottom of the same and then folded against the side thereof, as shown in Fig. 3, in which position the wings will be held against the body so as to economize space and permit the machine to be navigated through crowded city streets. When the wing is thus adjusted, of course, the transverse shaft 21 will have its sections uncoupled to permit the shifting of the wing, as will be readily understood.

To support the planes or wings 25 in their spread position, I employ braces 35 each consisting of a lower tubular member 36 secured to the side of the vehicle body and an outer rod 37 extending through the cap 38 secured upon the upper end of the said tubular member, the said rod 37 having its outer end pivoted to the underside of the plane and its inner end equipped with a piston 39, between which and the opposite ends of the tubular body 36, springs 40 and 41 are coiled. By this construction, the planes will be given a limited vertical movement, so that sudden gusts of wind will not tear the same from the body of the vehicle, while, at the same time, such a wide movement of the planes as will destroy their efficiency is prevented. The couplings 34, connecting the sections of the shafts 21, permit the outer sections of the shafts to follow the movements of the planes, so that there will be no cessation in the operation of the secondary propellers.

Elevating planes 42 are provided at the rear of the machine and have a common pivot or shaft 43 upon which are oppositely extending crank arms or levers 44 to the ends of which are secured controlling cables or rods 45 which extend through the body of the vehicle to a controlling lever 46 mounted on the side of the body adjacent the seat 7. The cables 45 are run through suitable conduits, indicated at 47, within the vehicle body and are so disposed as to pass above and below windows 48 formed in the sides of the body above seats 49 intended for the accommodation of passengers.

A rudder 50 is mounted between upper and lower arms 51 extending from the rear end of the vehicle body and connected thereto by braces 52 so as to withstand lateral strain, and the rudder post 53 is equipped with a cross-head 54, to the ends of which the steering cables 55 are attached. These cables 55 extend under a platform 56 within the body and have their front ends secured to the extremities of a cross-bar 56 rigid with the lower end of a steering shaft 57 disposed vertically within the body 1 of the vehicle and equipped at its upper end with a hand lever 58 adjacent the seat 7. The platform 56 constitutes a cover for the cables 55 as well as for the shaft 9 and the gearing connected therewith, so that these operating parts cannot be injured by passengers entering or leaving the vehicle.

The aviator's seat 7 is so arranged that the aviator will be enabled to obtain a view ahead and to either side above the body of the vehicle and to protect the aviator from the sun or from other elements, a canopy 59 is provided over the opening 60 in the top of the body and supported upon suitable posts 61, as will be readily understood.

When the machine is to be propelled from the ground, the power of the engine 8 is transmitted to the rear ground wheels 3, as before stated and as will be readily understood, and the course of the vehicle is controlled through the steering wheel 6, the wings being disposed as shown at the left of Fig. 3. When it is desired to navigate the air, the wings are spread, as shown in Fig. 1 and at the right in Fig. 3, and the engine is then adjusted to transmit its power to the propeller shaft 17. The several propellers will then be rotated at a high speed so that the machine will soar and the angle of ascent may be determined by tilting the elevating planes 42 in the proper direction and to the proper degree. The machine having reached the desired height, the elevating plane 42 is held in a horizontal position, and the flight will then proceed on an even keel. Should it be desired to turn to either side, the rudder 51 is manipulated, as will be readily understood, and the machine may be caused to descend by tilting the planes 42, as will be readily understood.

The wings are provided with eyes 62 which may be engaged by hooks 63 provided on the body of the vehicle to hold the planes in their folded position, as will be readily understood.

It will be readily seen that I have provided a machine by which passengers may be transported from point to point, either through the air or upon the ground, and in either case will be protected against the weather. Should a contemplated flight be interrupted by accident or other cause and it be necessary to alight, the journey may be continued upon the ground by adjusting the wings, as described, and then applying the power of the engine to the ground wheels so that the machine will then travel over the ground, as will be readily understood.

What I claim is:—

1. The combination of a body, wings mounted on the sides of the body and provided with transverse slots near their rear ends, propeller shafts mounted longitudinally on the wings, propellers at the ends of said shafts, the propeller at the rear end of the shaft playing in the transverse slot in the wing, and means for rotating said propeller shafts.

2. The combination of a body, wings hinged to the body, a propeller shaft within the body, means for rotating said shaft, secondary propeller shafts mounted upon the wings, propellers on said secondary shafts, transverse shafts geared to the said secondary propeller shafts and the propeller shaft within the body, and universal couplings interposed in said transverse shafts in the vertical planes of the hinged connections between the wings of the body.

3. The combination of a body, wings hinged to the sides of the same, propeller shafts mounted on the wings, propellers on said shafts, a motor within the body, and transverse shafts actuated by said motor and geared to the propeller shafts on the wings, said transverse shafts being equipped with universal couplings in the vertical planes of the hinge between the wings and the side of the body.

4. The combination with a wheel mounted body, and a supporting frame or wing having one straight edge hinged to the side of the body and comprising a forward portion extending laterally from the body, a similar rear portion extending laterally from the body to a lesser distance, and a similar intermediate portion connecting said forward and rear portions and terminating short of the outer edge of the rear portion.

5. The combination of a body, wings hinged to the sides of the body, propellers mounted on the wings, means for rotating said propellers, tubular supports secured on the sides of the body and projecting upwardly and rearwardly therefrom, rods secured to the wings and having their lower ends provided with heads playing in the said tubular supports, and coil springs arranged between the ends of the said supports and the sides of the said enlarged heads.

In testimony whereof I affix my signature in presence of two witnesses.

JOSEPH GAVURA. [L. S.]

Witnesses:

BEN GIBBON,
JOHN J. GAVURA.

Copies of this patent may be obtained for five cents each, by addressing the "Commissioner of Patents, Washington, D. C."